US012584891B2

(12) United States Patent (10) Patent No.: US 12,584,891 B2

Nakama (45) Date of Patent: Mar. 24, 2026

(54) GAS CHROMATOGRAPH

(71) Applicant: Shimadzu Corporation, Kyoto (JP)

(72) Inventor: Yuji Nakama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 288 days.

(21) Appl. No.: 18/287,285

(22) PCT Filed: Apr. 19, 2021

(86) PCT No.: PCT/JP2021/015891

§ 371 (c)(1),
(2) Date: Oct. 17, 2023

(87) PCT Pub. No.: WO2022/224312

PCT Pub. Date: Oct. 27, 2022

(65) Prior Publication Data

US 2024/0201141 A1    Jun. 20, 2024

(51) Int. Cl.
G01N 30/12        (2006.01)
G01N 30/16        (2006.01)
G01N 30/02        (2006.01)

(52) U.S. Cl.
CPC ............. G01N 30/12 (2013.01); G01N 30/16 (2013.01); *G01N 2030/025* (2013.01);
(Continued)

(58) Field of Classification Search
CPC .. G01N 30/12; G01N 30/16; G01N 2030/025; G01N 2030/121; G01N 2030/126; G01N 2030/167
(Continued)

(56) References Cited

U.S. PATENT DOCUMENTS

2003/0126908 A1*  7/2003  Furukawa .............. G01N 30/10
                                              73/23.42
2018/0238840 A1*  8/2018  Masuda ................. G01N 30/24
                (Continued)

FOREIGN PATENT DOCUMENTS

JP        H06-80172 U      11/1994
JP        H10-239294 A      9/1998
JP        2006-284345 A     10/2006

OTHER PUBLICATIONS

"Multi-Shot Pyrolyzer EGA/PY-3030D" by Frontier Lab, whole document, (year: 2013).*
(Continued)

*Primary Examiner* — Peter J Macchiarolo
*Assistant Examiner* — Rodney T Frank
(74) *Attorney, Agent, or Firm* — Muir Patent Law, PLLC

(57)            ABSTRACT

A gas chromatograph includes: a gas chromatograph body having an interior space thermally isolated from an outside; at least one sample vaporization unit mounted on an upper portion of the gas chromatograph body, the sample vaporization unit having a housing provided therein with a heating space surrounded by a heater and being configured to vaporize a sample injected into the heating space by heat from the heater and introduce the vaporized sample into the gas chromatograph body; and at least one cooling fan mounted on the gas chromatograph body to correspond to the at least one sample vaporization unit to blow cooling air toward the least one sample vaporization unit. A heat insulating member is interposed between the gas chromatograph body and the at least one cooling fan to thermally isolate the at least one cooling fan from the gas chromatograph body.

5 Claims, 2 Drawing Sheets

(52) U.S. Cl.
CPC . *G01N 2030/121* (2013.01); *G01N 2030/126*
(2013.01); *G01N 2030/167* (2013.01)

(58) Field of Classification Search
USPC ....................................................... 73/23.41
See application file for complete search history.

(56) References Cited

U.S. PATENT DOCUMENTS

| | | | | |
|---|---|---|---|---|
| 2018/0264393 A1* | 9/2018 | Okada | ................... | G01N 30/30 |
| 2018/0284078 A1* | 10/2018 | Shibutani | .............. | G01N 30/30 |
| 2023/0221289 A1* | 7/2023 | Sasaki | ................... | G01N 30/30 |
| | | | | 73/23.39 |

OTHER PUBLICATIONS

"Multi-Shot Pyrolyser," Apr. 17, 2016, pp. 1-8.
Written Opinion for PCT application No. PCT/JP2021/015891
dated Jun. 7, 2021.
First Office Action dispatched on Nov. 12, 2024 for the Japanese
Patent Application No. 2023-515896 from the JapanesePatent Office.
First Office Action dated Aug. 14, 2025 for the corresponding
Chinese Patent Application No. 202180096401.X.

* cited by examiner

GAS CHROMATOGRAPH

TECHNICAL FIELD

The present invention relates to a gas chromatograph (hereinafter referred to as "GC").

BACKGROUND ART

As one of sample injection methods for GC, there is a cold on-column injection (hereafter referred to as "OCI"). In the OCI, a sample is injected directly into a column, and then the temperature in the sample vaporization unit is rapidly increased to about 450° C. to vaporize the sample in the interior space of the column.

The OCI is often used to analyze a sample with a high boiling point, and the analysis time tends to be longer than that in a case where an injection method other than the OCI is used. For this reason, in order to shorten the total analysis time when using the OCI for continuous analyses, it is important to lower the temperature of the sample vaporization unit as quickly as possible after the elution of the sample from the column, so that the sample vaporization unit is set to the state in which the analysis for the subsequent sample can be initiated. For this reason, a countermeasure has been taken in which a cooling fan is provided in the vicinity of the sample vaporization unit to cool the sample vaporization unit with the cooling fan (see Patent Document 1).

PRIOR ART DOCUMENT

Patent Document
Patent Document 1: Japanese Unexamined Patent Application Publication No. 2006-284345

SUMMARY OF THE INVENTION

Problems to be Solved by the Invention

In the OCI-type GC, in order to position a cooling fan on the sample vaporization unit side, it is common that a metal sheet is attached to the top board of the gas chromatograph body (hereinafter referred to as "GC body") to accommodate a column, etc., in the interior space thereof, and a cooling fan is fixed on the sheet metal. Since the interior space of the GC body accommodating a column, etc., therein is surrounded by a heat insulating member to be thermally isolated from the outside air, it was considered that the heat from the interior space of the GC body during the analysis would not leak to the outside of the GC body. However, when consecutive analyses are performed over a long period of time, the heat from the interior space of the GC body is transferred to the cooling fan via the top board and the sheet metal. As a result, the temperature of the cooling fan exceeds its heat-resistant temperature, which can cause the failure or deterioration of the cooling fan.

The present invention has been made in view of the above-described problems. It aims to suppress the failure and/or the deterioration of a cooling fan due to consecutive analyses over a long period of time.

Means for Solving the Problems

The gas chromatograph according to the present invention includes:
 a gas chromatograph body having an interior space thermally isolated from an outside;

at least one sample vaporization unit mounted on an upper portion of the gas chromatograph body, the sample vaporization unit having a housing provided, in an interior space thereof, with a heating space surrounded by a heater, the sample vaporization unit being configured to vaporize a sample injected into the heating space by heat from the heater and introduce the vaporized sample into the gas chromatograph body; and
 at least one cooling fan mounted on the gas chromatograph body so as to correspond to a respective one of the at least one sample vaporization unit, the at least one cooling fan being configured to blow cooling air toward the respective one of the at least one sample vaporization unit,
 wherein a heat insulating member is interposed between the gas chromatograph body and a respective one of the at least one cooling fan to thermally isolate the respective one of the at least one cooling fan from the gas chromatograph body.

Effects of the Invention

According to the gas chromatograph of the present invention, a heat insulating member is interposed between the gas chromatograph body and the cooling fan to thermally isolate the cooling fan from the gas chromatograph body, thereby preventing the failure or deterioration of the cooling fan due to consecutive analyses over a long period of time.

EMBODIMENTS FOR CARRYING OUT THE INVENTION

Figure 1:
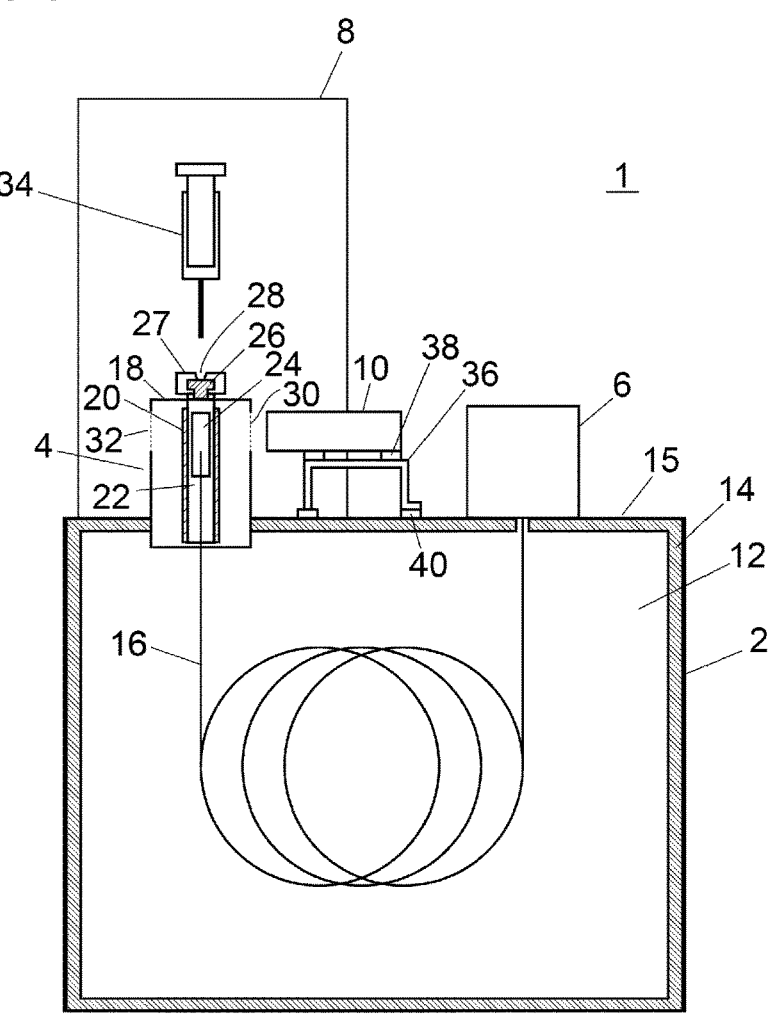
FIG. 1 is a partial cross-sectional configuration diagram showing one example of a gas chromatograph.

Hereinafter, one example of a gas chromatograph will be described with reference to the attached drawings.
The gas chromatograph (hereinafter referred to as "GC 1") is equipped with a gas chromatograph body 2 (hereinafter referred to as "GC body 2"), a sample vaporization unit 4, a detector 6, an injector 8, and a cooling fan 10. The sample vaporization unit 4, the detector 6, the injector 8, and the cooling fan 10 are mounted on the top of the GC body 2.
The interior space 12 of the GC body 2 is surrounded by a heat insulation material 14 to be thermally isolated from the outside of the GC body 2. The column 16 for separating components in a sample gas is accommodated in the interior space 12 of the GC body 2. The column 16 has one end in communication with the sample vaporization unit 4 and the other end in communication with the detector 6.
The sample vaporization unit 4 has a housing 18, and a heating space 22 surrounded by a heater 20 is formed in the housing 18. A cylindrical insert 24 is placed in the heating space 22 within the housing 18 of the sample vaporization unit 4, and one end of the column 16 is inserted inside the insert 24 from the below. A septum 26 is provided at the upper portion of the sample vaporization unit 4, and the upper portion of the heating space 22 is sealed by the septum 26. A cap 27 holding the septum 26 has a sample injection port 28 which is a through hole for guiding a needle of a syringe 34 of the injector 8 into the heating space 20. On the mutually opposite sides of the housing 18 of the sample vaporization unit 4, there are provided with an inlet port 30 for taking cooling air into the housing 18 and an outlet port 32 for discharging the air inside the housing 18 to the outside.

The injector 8 is configured to suck in a sample from a sample container (not shown) by moving the syringe 34 vertically and inject the sample into the column 16 by inserting a needle through the sample injection port 28 into the heating space 22 in the sample vaporization unit 4.

The cooling fan 10 is provided on the side of the sample vaporization unit 4 to direct the cooling air toward the inlet port 30 of the sample vaporization unit 4. The cooling fan 10 is supported by a metal support member 36 mounted on the top board 15 of the GC body 2. In this example, the heat insulating member 38 and the heat insulating member 40 are interposed between the support member 36 and the cooling fan 10 and between the top board 15 of the GC body 2 and the support member 36, respectively, thereby suppressing the transfer of the heat from the GC body 2 to the cooling fan 10. As the material for the heat insulating members 38 and 40, PTFE (polytetrafluoroethylene), a ceramic-based material, a Viton-based material, a nitrile-based material, etc., can be exemplified.

Note that it is sufficient that as long as the heat of the GC body 2 can be suppressed from being transferred to the cooling fan 10, only one of the heat insulating member 38 and the heat insulating member 40 may be provided, or the support member 36 itself may be formed of an insulating member made of a heat insulating material. In short, it is sufficient that a heat insulating member is interposed between the GC body 2 and the cooling fan 10. Further, in this example, although no duct or other structure is provided between the sample vaporization unit 4 and the cooling fan 10 to efficiently direct the cooling air generated by the cooling fan 10 into the sample vaporization unit 4, such a structure may be provided.

Figure 2:
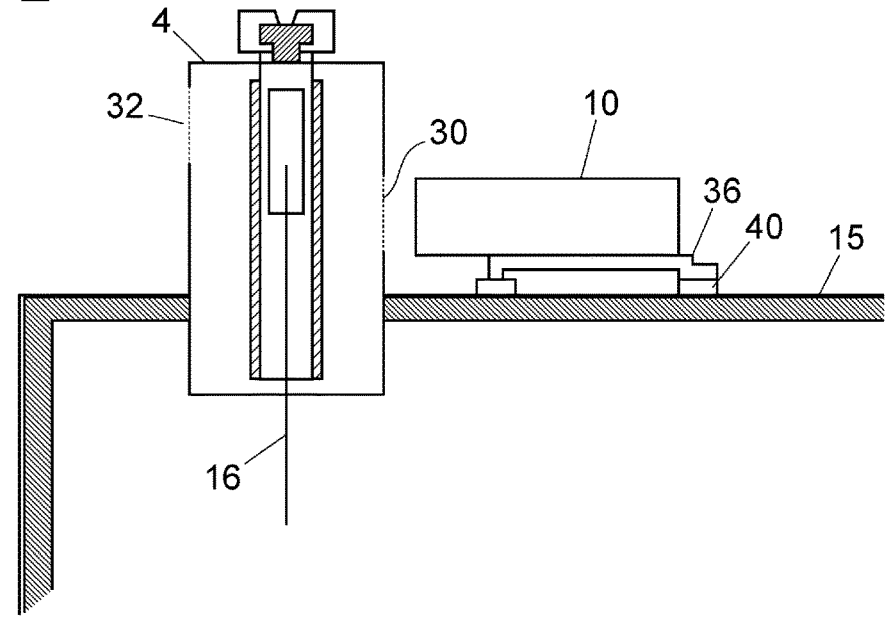
FIG. 2 is a diagram showing another example of a cooling structure in this example.

FIG. 2 shows an example in which the height of the support member 36 supporting the cooling fan 10 is set to be lower than that shown in FIG. 1 to bring the cooling fan 10 closer to the top board 15 of the GC body 2. Even if the cooling fan 10 is brought closer to the top board 15 of the GC body 2 as described above, since the heat insulating member 40 is interposed between the GC body 2 and the cooling fan 10, the heat of the GC body 2 is suppressed from being transferred to the cooling fan 10, thereby preventing the temperature of the cooling fan 10 from exceeding the heat-resistant temperature. As shown in FIG. 2, by installing the cooling fan 10 at a position lower than that shown in FIG. 1, it is possible to send the cooling air to the sample vaporization unit 4 from a lower position. By providing the outlet port 32 of the sample vaporization unit 4 at a position higher than the that of the inlet port 30, it is possible to efficiently discharge the heat in the sample vaporization unit 4 to the outside, thereby improving the cooling efficiency in the sample vaporization unit 4.

As described above, the height of the cooling fan 10 can be freely designed by interposing a heat insulating member between the GC body 2 and the cooling fan 10. Therefore, in the case of installing a plurality of cooling fans 10, the area occupied by the plurality of cooling fans 10 on the GC body 2 can be reduced by differentiating the heights of the cooling fans 10 from each other.

Figure 3:
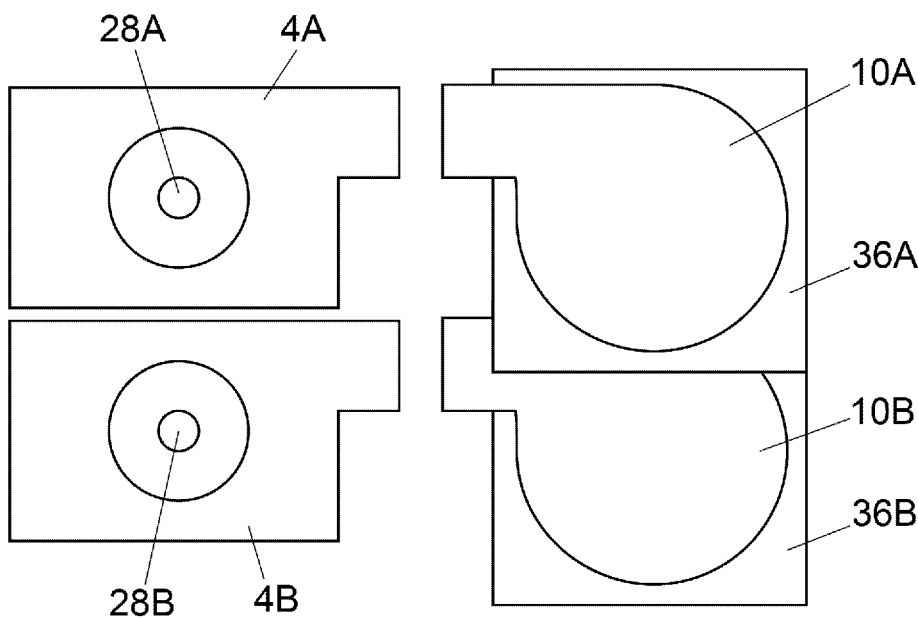
FIG. 3 is a layout view as seen from the above showing one example of an arrangement of cooling fans in a case where two sample vaporization units are mounted.

FIG. 3 is a layout view as seen from the above showing one example of the arrangement of two cooling fans 10A and

10B corresponding to the sample vaporization units 4A and 4B in a case where two units of sample vaporization units 4A and 4B are mounted on the GC body 2. In this example, the cooling fan 10A and the cooling fan 10B are arranged at mutually different positions so that they are partially overlapped with each other vertically. This allows the sample vaporization unit 4A and the sample vaporization unit 4B to be placed in close proximity to each other, thereby contributing to the downsizing of the GC body 2.

Note that the example described above is merely one example of an embodiment of the gas chromatograph according to the present invention. Embodiments of the gas chromatograph according to the present invention are shown below.

According to one embodiment of the gas chromatograph of the present invention, the gas chromatograph includes:

a gas chromatograph body having an interior space thermally isolated from an outside;

at least one sample vaporization unit mounted on an upper portion of the gas chromatograph body, the sample vaporization unit having a housing provided, in an interior space thereof, with a heating space surrounded by a heater, the sample vaporization unit being configured to vaporize a sample injected into the heating space by heat from the heater and introduce the vaporized sample into the gas chromatograph body; and at least one cooling fan mounted on the gas chromatograph body so as to correspond to a respective one of the at least one sample vaporization unit, the at least one cooling fan being configured to blow cooling air toward the respective one of the at least one sample vaporization unit, wherein a heat insulating member is interposed between the gas chromatograph body and a respective one of the at least one cooling fan to thermally isolate the respective one of the at least one cooling fan from the gas chromatograph body.

In the first aspect of the above-described embodiment, at least a portion of a support member for supporting the respective one of the at least one cooling fan on the gas chromatograph body is constituted by the heat insulating member.

In the second aspect of the above-described embodiment, the at least one sample vaporization unit is composed of one sample vaporization unit, the sample vaporization unit is provided with an inlet port for taking the cooling air blown by the cooling fan into the interior space of the housing and an outlet port for discharging air in the interior space of the housing, the air outlet port being arranged at a position higher than a position of the inlet port, and the cooling fan is provided to direct the cooling air toward the inlet port of the housing of the sample vaporization unit.

With this aspect, the cooling efficiency in the sample vaporization unit can be improved.

In the third aspect of the above-described embodiment, the at least one sample vaporization unit is composed of two or more sample vaporization units, the two or more sample vaporization units are each provided with an inlet port for taking the cooling air blown by the cooling fan into the interior space of the housing, the inlet ports of the two or more sample vaporization units being arranged at positions different in height, and the cooling fans corresponding to the respective sample vaporization units are provided at heights different from each other to blow the cooling air to the inlet port of the corresponding sample vaporization unit.

With this aspect, since the plurality of cooling fans can be arranged so that portions thereof overlap each other vertically, the installation area of the plurality of cooling fans can be reduced, and as a result, the gas chromatograph can be downsized.

In the fourth aspect of the above-described embodiment, the sample vaporization unit is a sample vaporization unit for cold on-column injection.

DESCRIPTION OF REFERENCE SYMBOLS

1: GC
2: GC body
4, 4A, 4B: Sample vaporization unit
6: Detector
8: Injector
10, 10A, 10B: Cooling fan
12: Interior space
14: Heat insulation material
15: Top board of GC body
16: Column
18: Housing of Sample vaporization unit
20: Heater
22: Heating space
24: Insert
26: Septum
28: Sample injection port
30: Inlet port
32: Outlet port
34: Syringe
36: Support member
38, 40: Heat insulating member

The invention claimed is:

1. A gas chromatograph comprising:

a gas chromatograph body having an interior space, a first heat insulating member, and a top board, the first heat insulating member being provided to surround the interior space to thermally isolate the interior space from an outside, and the top board being located above a top surface of the first heat insulating member;

a sample vaporization unit mounted on the top board of the gas chromatograph body, the sample vaporization unit having a housing provided, in an interior space thereof, with a heating space surrounded by a heater, the sample vaporization unit being configured to vaporize a sample injected into the heating space by heat from the heater and introduce the vaporized sample into the gas chromatograph body;

a second heat insulating member different from the first heat insulating member and provided at a position on the top board of the gas chromatograph body different from a position where the sample vaporization unit is mounted, and a cooling fan mounted on the second heat insulating member to blow cooling air toward the sample vaporization unit, wherein the second heat insulating member is interposed between the top board of the gas chromatograph body and the cooling fan to thermally isolate the cooling fan from the gas chromatograph body.

2. The gas chromatograph as recited in claim 1, further comprises a metal support member mounted on the second insulating member, wherein the cooling fan is mounted on the metal support member.

3. The gas chromatograph as recited in claim 1, wherein the sample vaporization unit is composed of one sample vaporization unit, wherein the sample vaporization unit is provided with an inlet port for taking the cooling air blown by the cooling fan into the interior space of the housing and an outlet port for discharging air in the interior space of the housing, the air outlet port being arranged at a position higher than a position of the inlet port, and wherein the cooling fan is provided to direct the cooling air toward the inlet port of the housing of the sample vaporization unit.

4. The gas chromatograph as recited in claim 1, comprises two or more sample vaporization units including the sample vaporization units and two or more cooling fans, corresponding to the two or more sample vaporization units respectively, including the cooling fan, wherein the two or more sample vaporization units are each provided with an inlet port for taking the cooling air blown by the cooling fan into the interior space of the housing, the inlet ports of the two or more sample vaporization units being arranged at positions different in height, and wherein the cooling fans corresponding to the respective sample vaporization units are provided at heights different from each other to blow the cooling air to the inlet port of the corresponding sample vaporization unit.

5. The gas chromatograph as recited in claim 1, wherein the sample vaporization unit is a sample vaporization unit for cold on- column injection.

* * * * *